United States Patent [19]

Orlowski

[11] 4,138,856
[45] Feb. 13, 1979

[54] LEAK DETECTOR DEVICE
[75] Inventor: Raymond Orlowski, Clifton Park, N.Y.
[73] Assignee: Sun-Econ, Inc., Ballston Lake, N.Y.
[21] Appl. No.: 840,430
[22] Filed: Oct. 7, 1977
[51] Int. Cl.² .............................................. F25B 1/00
[52] U.S. Cl. ...................................... 62/181; 62/127; 165/11; 165/70
[58] Field of Search ...................... 165/11, 70; 62/126, 62/127, 181; 340/242; 73/40.5 R

[56] References Cited
U.S. PATENT DOCUMENTS

| | | | |
|---|---|---|---|
| 3,123,984 | 3/1964 | Leonard | 165/70 |
| 3,395,676 | 8/1968 | Sprague | 165/70 |
| 3,400,753 | 9/1968 | Slover | 165/1 |
| 3,522,008 | 7/1970 | Defabaugh | 165/70 X |

*Primary Examiner*—Alan Cohan
*Attorney, Agent, or Firm*—Pollock, Vande Sande & Priddy

[57] ABSTRACT

Apparatus responsive to leaks occurring in a heat exchanger between a first tubular passageway which transports a heat transfer fluid at a relatively low pressure and a surrounding concentrically second tubular passageway which transports a refrigerant at a relatively higher pressure and including a sensor positioned to respond to the occurrence of a leak permitting the refrigerant to pass into the first passageway, a relay which is actuated by the sensor upon detection of a leak, and a plurality of valves which may be selectively actuated to interrupt the flow of either or both fluids through the heat exchanger.

19 Claims, 3 Drawing Figures

LEAK DETECTOR DEVICE

BACKGROUND OF THE INVENTION

It is known to position a co-axial counter-flow heat exchanger between a compressor and condenser in a refrigeration system to recover the waste heat produced during the refrigeration cycle. A significant problem associated with the use of such a heat exchanger is the detection and control of a leak which may possibly occur between the concentrically tubular passageways extending through the heat exchanger. If leaks are not detected and controlled, disastrous consequences may result. For example, in a super-market the loss of refrigerant gas from the primary refrigeration system resulting from a leak in the heat exchanger could result in the spoilage of perishable foods. Likewise, in a hospital where purified water is required, the leaking refrigerant gas could contaminate the water flowing through the heat exchanger.

U.S. Pat. No. 3,400,753, issued Sept. 10, 1968, attempts to control leaks through a heat exchanger by sensing the change in either the flow rate or the pressure differential between the two flow conduits (Page 2, lines 13-20). U.S. Pat. No. 3,400,753 reduces the flow rate in one of the conduits until the pre-set differential is again achieved. At this point the flow rate is allowed to increase. This system is much more complex than applicant's apparatus in requiring at least two flow rate controllers and a differential pressure-sensing means in addition to the necessary valves. Applicant's apparatus can be further distinguished from U.S. Pat. No. 3,400,753 for two reasons. First of all, applicant's sensing apparatus detects a change in parameter of only one fluid flowing through said heat exchanger. Therefore, there is no need for any comparison equipment. Secondly, applicant's apparatus positively interrupts flow through the heat exchanger until the leak can be eliminated and the apparatus is manually reset. U.S. Pat. No. 3,400,753 will allow fluid to flow through reboiler 4 once the pre-set differential is reached whether or not the leak has been eliminated.

SUMMARY OF THE INVENTION

An object of this invention is to provide an apparatus which automatically detects the occurrence of a leak permitting refrigerant gas to pass into the heat transfer fluid passageway. The apparatus then reacts to the leak by automatically actuating one or more valves in the fluid flow passageways to prevent the fluid from flowing through the heat exchanger. The flow of either fluid may be stopped or caused to bypass the heat exchanger.

Another object of the present invention is to provide an apparatus which must be manually reset before resumption of operation. A further object of the present invention is to provide a relief passage which drains the mixture of refrigerant gas and water trapped in the heat exchanger by actuation of the detection device of the present invention.

These objects are given only by way of example. Thus other desirable objects and advantages inherently achieved by the invention may occur to those skilled in the art.

The apparatus of the present invention includes a sensor positioned in either the inlet or outlet heat transfer fluid passageway. The sensor responds to the occurrence of a leak permitting the refrigerant gas to pass into the heat transfer fluid by energizing a relay which is wired to actuate one or more valves to either block the flow passages through the heat exchanger or entirely bypass the heat exchanger. The sensor can be actuated by either a significant increase in the pressure of the fluid within the heat transfer conduit or by actually sensing halogen-type gas in the heat transfer conduit. The apparatus is manually resettable to ensure that the operator may correct any leaks before resumption of operation.

BRIEF DESCRIPTION OF THE DRAWINGS

Further characteristics and advantages of the invention appear with reference to the accompanying drawings, in which.

DESCRIPTION OF THE PREFERRED EMBODIMENT

Figure 1:
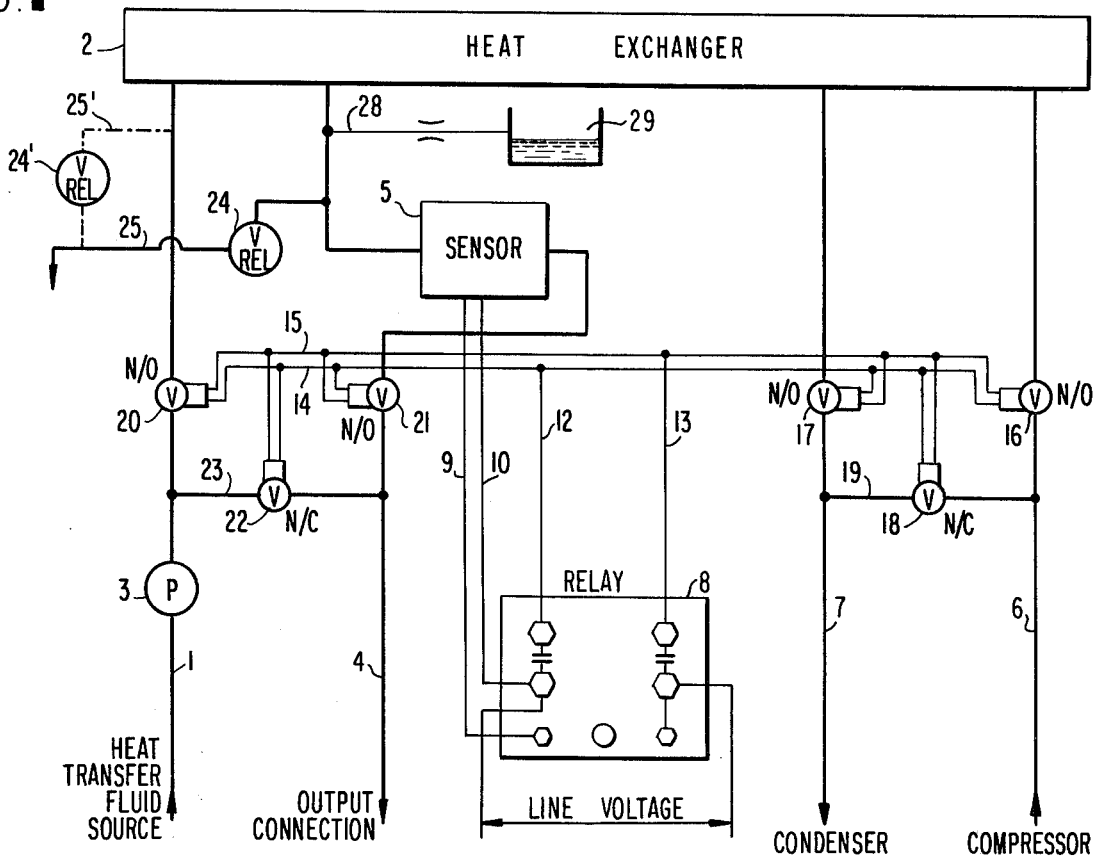
FIG. 1 shows a schematic representation of a preferred embodiment of the detection apparatus combined with a heat exchanger and associated fluid conduits.

Referring now to the drawings and FIG. 1 in particular, a conduit 1 extends from a source (not shown) of heat transfer fluid, such as water, to an inlet of an inner cylindrical coil passageway extending through a heat exchanger 2, similar to the type used in the heat reclamation apparatus disclosed in a co-pending application Ser. No. 736,004, filed Oct. 27, 1976, now U.S. Pat. No. 4,089,667 assigned to the same assignee as the present application and incorporated by reference herein. The heat exchanger 2 shown in block diagram form is of the co-axial counter flow type including a cylindrical coil arrangement. Those skilled in the art will recognize, of course, that other heat exchanger types may be used within the scope of the invention.

A pump 3 circulates the heat transfer fluid through conduit 1, forcing the fluid to flow through heat exchanger 2. A further conduit 4 extends from an outlet of the inner cylindrical coil passageway in heat exchanger 2 to an output connection (not shown). A sensor 5, whose function will be described hereafter is positioned in conduit 4 downstream of heat exchanger 2.

A conduit 6 extends from a compressor (not shown) in a known refrigeration system to an inlet of an outer cylindrically tubular passageway extending through heat exchanger 2, while a conduit 7 extends from an outlet of the outer cylindrically tubular passageway in heat exchanger 2 to a condensor (not shown) in the same refrigeration system.

Figure 2:
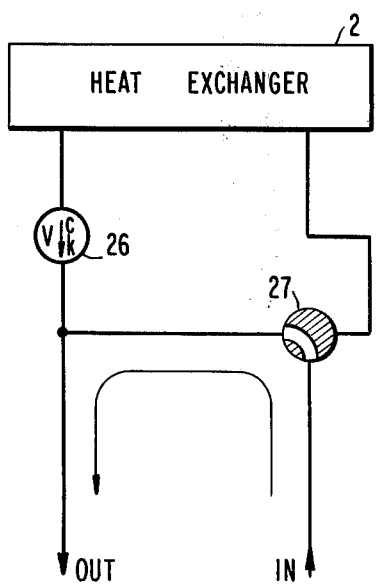
FIG. 2 shows a schematic representation of the valve assembly of an alternative embodiment, wherein the valve assembly is substituted in either or both of the heat transfer fluid and refrigerant gas flow systems.
Figure 3:
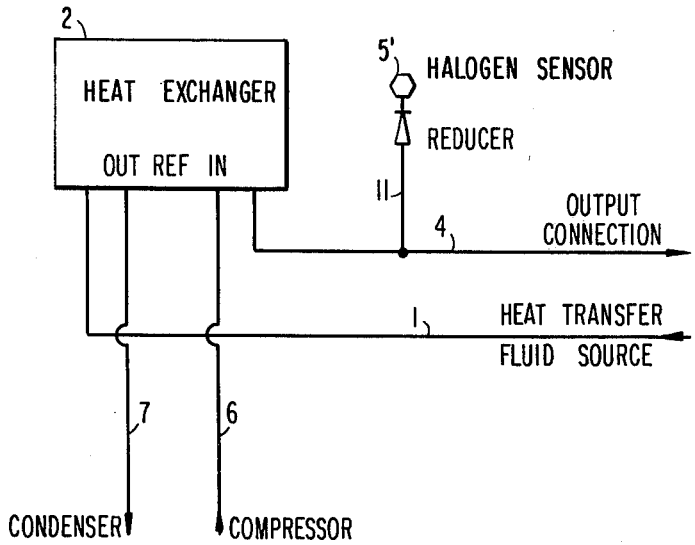
FIG. 3 shows a schematic representation of a halogen-sensing detector combined with the heat exchanger and associated fluid conduits.

With particular reference to FIGS. 1 and 2, the sensor 5 positioned in conduit 4 between heat exchanger 2 and the output connection may take various forms within the scope of the invention including a pressure-sensing device or a halogen-sensing device as shown in FIG. 3.

In the case where a pressure sensor is used, such a sensor reacts to a pre-set fluid pressure present in conduit 4. Upon occurrence of a leak between the concentric cylindrically tubular passageways within heat exchanger 2, refrigerant gas in the outer cylindrically tubular passageway which is under a relatively higher flow pressure is forced into the inner cylindrically tubular passageway because the heat transfer fluid is under a relatively lower flow pressure. Because the heat transfer fluid such as water is incompressible, the pressure within the inner cylindrically tubular passageway will immediately rise. When the pressure in the inner cylindrically tubular passageway rises significantly to a preset level, it is sensed by pressure sensor 5.

In an alternative embodiment, pressure sensor 5 may be placed in conduit 1 between the source of heat transfer fluid and heat exchanger 2. The operation of sensor 5 is similar whether placed in conduits 1 or 4. For example, in a specific embodiment water may flow at 40 lbs. per square inch pressure, while the refrigerant gas in the same embodiment may flow at up to 200 lbs. per square inch pressure. A leak occurring between the concentric cylindrically tubular passageways within the heat exchanger will cause the pressure in the inner tubular passageway to rise to at least 100 lbs. per square inch. The pressure-sensing device 5 having been preset to react to 100 lbs per square inch pressure in the water flow passageway will energize an electrical relay 8 through electrical lines 9 and 10.

Referring now to FIG. 3, a halogen sensor 5' is positioned vertically above a horizontal portion of conduit 4 and is attached by a conduit 11 to conduit 4. The halogen sensor 5' may be similar to the halogen sensor in U.S. Pat. No. 3,919,360, issued on Nov. 9, 1976. It is important that the halogen sensor 5' be positioned vertically above a horizontal portion of conduit 4 to prevent the heat transfer fluid from directly contacting the halogen-sensing element and disabling the sensing mechanism. After a leak occurs, a mixture of heat transfer fluid and refrigerant gas flows through conduit 4 with the heat transfer fluid rising within conduit 11 to a point below the halogen-sensing mechanism 5'. The halogen in the refrigerant gas separates from the heat transfer fluid and passes through the halogen-sensing mechanism 5'. The mechanism 5' detects the presence of the halogen gas and energizes an electrical relay 8 through the wires 9 and 10 in a similar manner to the pressure-sensing mechanism.

When the pressure-sensing mechanism is used, it is important that either the pressure sensor 5 or relay 8 be manually resettable to ensure that the operator can correct any leaks before the heat exchanger is reactivated. When the halogen-sensing mechanism is used, the relay 8 should be manually resettable to allow the operator time to correct any leaks.

The detection operation of the apparatus will now be described. A heat transfer fluid such as water flows from conduit 1, through the inner cylindrically tubular passageway within heat exchanger 2, past sensor 5, and finally through conduit 4 to an output connection; while a refrigerant gas flows from conduit 6 through the outer cylindrically tubular passageway in heat exchanger 2 and through conduit 7. When a leak occurs between the co-axial tubular passageways within heat exchanger 2, the refrigerant gas under higher relative pressure is forced into the heat transfer fluid passageway. Sensor 5 responds to the occurrence of a leak of refrigerant gas into the heat transfer fluid passageway by energizing relay 8. Relay 8, upon receiving a signal from sensor 5, in turn, sends a signal through electrical lines 12, 13, 14 and 15 actuating valves for blocking the flow of the heat transfer fluid or the refrigerant gas or both through heat exchanger 2.

The fluid control operation of the apparatus will now be described in detail. Normally open valves 16 and 17 are positioned in conduits 6 and 7 respectively. A further normally closed valve 18 is positioned in a conduit 19 extending between conduits 6 and 7. Valves 16, 17 and 18 are electrically connected to lines 14 and 15. On occurrence of a leak in the heat exchanger 2, an electrical signal is sent by sensing mechanism 5, through relay 8 to close valves 16 and 17 while simultaneously opening valve 18. The refrigerant gas then flows directly from the compressor, through conduits 6, 19 and 7 to the condenser, bypassing the cylindrically tubular passageway in heat exchanger 2. This arrangement of valves has direct application, for example, in a supermarket where it is critical to maintain refrigeration in spite of the occurrence of a leak within heat exchanger 2. Any blockage of flow of refrigerant gas in the primary refrigeration system could result in expensive spoilage of perishable food products.

In a further application of the invention, normally open valves 20 and 21 are positioned in conduits 1 and 4 respectively while a normally closed valve 22 is positioned in a conduit 23 extending between conduits 1 and 4. A signal from sensor 5 indicating a leak in heat exchanger 2, is transmitted through relay 8 closing valves 20 and 21 while simultaneously opening valve 22. The heat transfer fluid such as water then flows from the heat transfer fluid source through conduits 1, 23 and 4 to the output connection, bypassing the tubular passageway in heat exchanger 2.

A pressure relief valve 24 may be positioned in a conduit 25 which attaches to conduit 4 between valve 21 and heat exchanger 2 and extends to a drain (not shown). The significantly increased pressure in the heat transfer fluid passageway due to occurrence of a leak in heat exchanger 2 actuates valve 24, thereby allowing the mixture of heat transfer fluid and refrigerant gas to flow through conduit 25 to the drain.

In an alternative arrangement, a pressure relief valve 24' may be positioned in a conduit 25' attached to conduit 1 between valve 20 and heat exchanger 2 and extending to the drain. The operation of pressure relief valve 24' is similar to the operation of pressure relief valve 24.

Likewise, sensor 5 may send an electrical signal through relay 8 to valves 16, 17, 18, 20, 21 and 22 forcing both the heat transfer fluid and refrigerant gas to bypass the heat exchanger 2 and flow directly from their inlet sources to their outlet connections.

It is within the scope of the invention to eliminate either or both valves 18 and 22, and associated conduits 19 and 23 respectively. If valve 18, and associated conduit 19 were eliminated, the refrigerant gas would be blocked from entering the heat exchanger 2 by closing of valve 16, while the refrigerant gas would be prevented from leaving the heat exchanger 2 and entering the condenser by the closing of valve 17. If valve 22, and associated conduit 23 were eliminated, the heat transfer fluid would be blocked from entering the heat exchanger 2 by the closing of valve 20, while the mixture of heat transfer fluid and refrigerant gas would be blocked from leaving the heat exchanger by the closing of valve 21.

FIG. 2 shows an alternative embodiment including a block diagram of heat exchanger 2 with inlet and outlet passageways. A check valve 26 and a three-way valve 27 have been positioned in the outlet and inlet passageways, respectively. It is within the scope of the invention to substitute the valve assembly 26 and 27 for the valve assemblies shown in the heat transfer fluid passageways, or the refrigerant gas passageways of both pairs of passageways. The operation of the valve assembly of FIG. 2 is similar to that of the valve assemblies shown in FIG. 1. Upon detection of a leak, sensor 5 energizes relay 8 which actuates three-way valve 27 to block the inlet passage into heat exchanger 2 forcing the fluid to bypass heat exchanger 2 and flow directly into the output passageway. Check valve 26 operates in a known manner to block the fluid from flowing into heat exchanger 2 from the outlet passageway.

It is further within the scope of the invention that the various valves may be of any well-known type which can be actuated to open or close the flow paths through the conduits upon detection of a leak.

A heat transfer fluid, such as water, will undergo both a rise in temperature and thermal expansion as a result of passing through heat exchanger 2. The thermal expansion may inadvertently activate pressure sensor 5 though no leak has actually occurred within heat exchanger 2. To minimize the possibility of such an occurrence, a small diameter tubular member 28, known as an "Expansion Limiter Tube" is jointed at one end to conduit 4 and at the opposite end to an expansion tank 29 which may be open to the atmosphere.

During the normal operation of heat exchanger 2, a small amount of heated water will naturally flow through tubular member 28 into expansion tank 29. Because thermal expansion is a relatively slow process, the tubular member 28 and tank 29 will function to vent a sufficient amount of heated water to prevent a pressure increase sufficient to trigger sensor 5. When a leak does occur in heat exchanger 2, the small diameter tubular member 28 cannot vent a sufficient amount of heated water to compensate for the increased pressure and the sensor 5 is thereby activated. It has been determined that the smaller the diameter of tube 28, up to a point, the greater the sensitivity the leak detector will have for small leaks occurring within heat exchanger 2.

The invention is not restricted to the above-mentioned and by way of example shown in embodiments, but may be subjected to modifications within the scope of the following claims.

What I claim is:

1. Apparatus responsive to leaks occurring in a heat exchanger between a first tubular passageway which transports a heat transfer fluid at a relatively lower pressure and a second surrounding concentrically tubular passageway which transports a refrigerant gas at a relatively higher pressure comprising:
    sensor means responsive to a change in a parameter of only the heat transfer fluid in said first passageway indicative of a leak between said first and second tubular passageways;
    and means actuated by said sensor means for interrupting flow through at least one said first and second passageways to prevent the further leakage of refrigerant gas into the heat transfer fluid;
    said means actuated by said sensor means being manually resettable to a normal condition providing fluid flow through said first and second tubular passageways within said heat exchanger.

2. Apparatus according to claim 1, wherein said sensor means comprises:
    a pressure-sensing means responsive to a pre-set increased pressure in said first passageway resulting from a leak of said refrigerant gas at a higher pressure into said heat transfer fluid at a lower pressure;
    said pressure sensing means generating a signal to actuate said controlled means for interrupting flow through at least one of said first and second passageways within said heat exchanger.

3. Apparatus according to claim 2, wherein said pressure-sensing means is positioned in an outlet of said first tubular passageway for sensing the increased pressure of said heat transfer fluid resulting from a leak between said first and second tubular passageways within said heat exchanger.

4. Apparatus according to claim 2, wherein said pressure-sensing means is positioned in an inlet of said first tubular passageway for sensing the increased pressure of said heat transfer fluid resulting from a leak between said first and second tubular passageways within said heat exchanger.

5. Apparatus according to claim 1, wherein said sensor means comprises:
    a refrigerant gas sensing means responsive to the presence of said refrigerant gas in said first tubular passageway;
    said refrigerant gas sensing means generating a signal which activates said controlled means for interrupting flow through at least one of said first and second tubular passageways in said heat exchanger.

6. Apparatus according to claim 5, wherein said refrigerant gas sensing means is positioned vertically above a horizontal portion of said outlet of said first tubular passageway and is connected by a tubular conduit means to said outlet;
    the position of said refrigerant sensing means being chosen to allow said refrigerant gas which has leaked into said tubular passageway to separate from said heat transfer fluid, rise vertically through said tubular conduit and pass through said refrigerant sensing means, while preventing direct contact between said refrigerant sensing means and said heat transfer fluid which would disable said refrigerant sensing means.

7. Apparatus according to claim 1, wherein said means actuated by said sensor means comprises:
    relay means responsive to a signal generated by said sensor means indicative of a leak between said first and second tubular passageways;
    and valve means actuated by said relay means for interrupting flow through at least one of said first and second passageways to prevent further leakage between said first and second tubular passageways within said heat exchanger.

8. Apparatus according to claim 7, wherein said relay means is manually resettable to a non-energized condition existing prior to actuation by said sensor means.

9. Apparatus according to claim 7, wherein said valve means comprises:
    at least one valve responsive to said relay means for providing an alternative flow path for at least one of said fluids flowing through said first and second tubular passageways;
    said alternate flow path extending from an input source of at least one of the fluids to an output source of at least one of the fluids which bypasses at least one of said first and second tubular passageways extending through said heat exchanger.

10. Apparatus according to claim 7, wherein said valve means further comprises:
    a plurality of valves responsive to said relay means for interrupting flow through both said first and second tubular passageways within said heat exchanger to prevent further leakage.

11. Apparatus according to claim 7, wherein said valve means comprises:
a first normally open valve positioned in an inlet of said first tubular passageway extending within said heat exchanger;
said first and second valves being closed responsive to a signal from said relay means to block said heat transfer fluid from flowing through said first tubular passageway upon occurrence of a leak between said first and second tubular passageways.

12. Apparatus according to claim 11, wherein said valve means comprises:
a third normally closed valve positioned in a heat transfer fluid passageway which connects to an inlet of said first tubular passageway upstream of said first valve and further connects to an outlet of said first tubular passageway downstream of said second valve;
said third valve being opened responsive to said signal from said relay means to provide an alternative path for said heat transfer fluid from heat transfer fluid source to said output connection which bypasses said first tubular passageway in said heat exchanger.

13. Apparatus according to claim 7, wherein said valve means further comprises:
a first normally open valve positioned in an inlet of said second tubular passageway;
a second normally open valve positioned in an outlet of said second tubular passageway;
said first and second valves being closed responsive to a signal from said relay means to block the refrigerant gas from flowing through said second tubular passageway upon occurrence of a leak between said first and second tubular passageways.

14. Apparatus according to claim 13, wherein said valve means comprises:
a third normally closed valve positioned in a refrigerant gas passageway which connects to an inlet of said second tubular passageway upstream of said first valve, and connects to an outlet of said second tubular gas passageway downstream of said second valve;
said third valve being opened responsive to said signal from said relay means to provide an alternate flow path for said refrigerant gas from said compressor to said condenser which bypasses said second tubular passageway in said heat exchanger.

15. Apparatus according to claim 7, wherein said valve means comprises:
a three-way valve positioned in an inlet of said first tubular passageway;
a check-valve positioned in an outlet of said first tubular passageway;
a third heat transfer fluid passageway extending from said three-way valve to said inlet of said first tubular passageway downstream of said check-valve;
said three-way valve being actuated responsive to a signal from said relay to provide an alternate flow path for said heat transfer fluid from said heat transfer fluid source to said output connection which bypasses said first tubular passageway in said heat exchanger.

16. Apparatus according to claim 7, wherein said valve means further comprises:
a three-way valve positioned in an inlet of said second tubular passageway extending through said heat exchanger;
a check-valve positioned in an outlet of said second tubular passageway extending through said heat exchanger;
a third refrigerant gas passageway extending from said three-way valve to said inlet of said second tubular passageway downstream of said check-valve;
said three-way valve being actuated responsive to a signal from said relay to provide an alternate flow path for said refrigerant gas from said compressor to said condenser which bypasses said second tubular passageway in said heat exchanger.

17. Apparatus according to claim 11, wherein a normally closed pressure relief valve is positioned in a passageway extending from an outlet of said first tubular passageway upstream from said second valve to a drain;
said pressure relief valve being opened responsive to an increase in pressure in said first tubular passageway indicative of a leak between said first and second passageways, to provide an alternate flow path for said mixture of heat transfer fluid and refrigerant gas from said outlet of said first tubular passageway to said drain.

18. Apparatus according to claim 11, where in normally closed pressure relief valve is positioned in a passageway extending from an inlet of said first tubular passageway downstream from said first valve to a drain;
said pressure relief valve being opened responsive to an increase in pressure in said first tubular passageway indicative of a leak between said first and second passageways, to provide an alternate flow path for said mixture of heat transfer fluid and refrigerant gas from said inlet of said first tubular passageway to said drain.

19. Apparatus according to claim 1, where a hollow tubular member is joined at one end to an outlet of said first tubular passageway and at an opposite end to an expansion tank;
said tubular member functioning to vent only enough heat transfer fluid to compensate for any gradual increase in pressure due to thermal expansion of said heat transfer fluid while preventing inadvertent activation of said sensor means responsive to said thermal expansion.

* * * * *